United States Patent Office 2,802,835

Patented Aug. 13, 1957

1

2,802,835

3-BENZYLOXYPHTHALIDE

Donald D. Wheeler and David C. Young, Midland, Mich., assignors to The Dow Chemical Company, Midland, Mich., a corporation of Delaware No Drawing. Application April 30, 1956, Serial No. 581,352

1 Claim. (Cl. 260—343.3)

This invention is directed to 3-benzyloxyphthalide having the structure

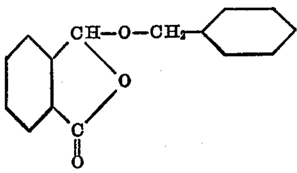

This new compound is a light-colored solid, soluble in organic solvents such as benzene and acetone and substantially insoluble in water. It is valuable as a germicide and is adapted to be employed for the control of bacterial organisms.

The compound of this invention is conveniently prepared by causing phthalaldehydic acid to react with benzyl alcohol. The terms "phthalaldehydic acid" and "3-hydroxyphthalide" refer to a compound having the structure

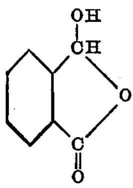

Phthalaldehydic acid is often represented in the literature as having the structure

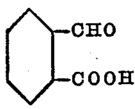

However, the acid employed in this invention and prepared as hereinafter described exists almost entirely in the closed ring, 3-hydroxyphthalide structure, as observed from a study of its infrared absorption spectrum. The infrared spectrum supports the closed-ring 3-benzyloxyphthalide structure for the product.

In a preferred method for carrying out the reaction, phthalaldehydic acid and benzyl alcohol are mixed and

2 heated in the temperature range of from 90° to 120° C. The reaction takes place with the formation of 3-benzyloxyphthalide product and water of reaction. The latter begins to reflux during the heating period and the mixture is thereafter maintained under reflux for one to three hours. On completion of the heating, the reaction mixture is poured into water forming a heterogeneous mixture which separates into an aqueous phase and an organic product phase. The aqueous phase is decanted from the organic product and the latter dissolved in benzene. The benzene solution is heated to distill first the water as a benzene-water azeotrope and then the benzene and to obtain the desired product as residue.

In a representative operation, 52 grams (0.5 mole) of benzyl alcohol and 75 grams (0.5 mole) of phthaladehydic acid were mixed and heated in the temperature range of 110°–120° C. for two hours. The mixture was poured into 500 milliliters of water whereupon an oil precipitated. The aqueous solution was decanted from the oil and the latter dissolved in benzene. The benzene solution was heated to distill benzene and water and to obtain as residue a 3-benzyloxyphthalide product. The latter solidified on standing to a substance melting at 47°–50° C. The yield of the product was 93.5 grams or 79 percent of theoretical.

The novel compound of the present invention is useful as a germicide and may be employed for the control of bacterial organisms. In a representative determination, a solid nutrient agar medium saturated with 3-benzyloxyphthalide was sreaked with *Staphylococcus aureus* and incubated at 30° C. for three days. At the end of this period, complete inhibition of the test organism was observed.

The phthalaldehydic acid employed in this invention may be prepared by photochlorinating o-xylene to obtain $\alpha,\alpha,\alpha,\alpha',\alpha'$-pentachloro-o-xylene by passing chlorine gas into o-xylene while illuminating with sun lamps. The resulting chlorinated o-xylene is then heated with aqueous constant-boiling hydrochloric acid containing 10 percent ferric chloride solution to obtain phthalaldehydic acid, as more fully disclosed and claimed in a copending application of James D. Head and Owen D. Ivins, Serial Number 279,682, filed March 31, 1952, now Patent 2,748,162.

We claim:

3-benzyloxyphthalide.

References Cited in the file of this patent

UNITED STATES PATENTS 2,150,595 Austin et al. Mar. 14, 1939

FOREIGN PATENTS 523,466 Canada Apr. 3, 1956

OTHER REFERENCES

Bistrzycki et al.: Berichte, Vol. 27, pp. 2632–40 (1894).